April 14, 1953   L. M. STRAND   2,634,506
GAUGING DEVICE FOR CHANNEL BARS
Filed Oct. 26, 1951

Inventor:
L. M. Strand
By: Paul O. Pippel
Attorney

Patented Apr. 14, 1953

2,634,506

UNITED STATES PATENT OFFICE 2,634,506

GAUGING DEVICE FOR CHANNEL BARS

Leslie M. Strand, Chicago, Ill.

Application October 26, 1951, Serial No. 253,330

8 Claims. (Cl. 33—148)

1

This invention relates to a gauging device for channel bars. More particularly, this invention relates to a device for measuring the height of the legs of U-shaped members such as channel bars.

In the manufacture of channel sections or U-shaped bars a constant check must be made to determine that the manufacturing discrepancies in the height or length of the two legs is maintained within the allowable limits or tolerances maintained in the manufacture of articles of this type. Ordinary calipers for measuring the legs of the channel bars have been found to be very ineffective and inaccurate. The type of calipers which have generally been used for measuring channel bars consist of a pair of parallel legs which are moved relative to each other, one of the legs being applied to the undeneath side of the channel and the other leg being applied in a horizontal plane across the upper edges or ends of the legs of the bar. In channel bars wherein the legs exceeded the allowable tolerances it was generally very difficult to determine the exact degree of discrepancy between the legs since the flat section of the channel bar or the base wall could not be maintained in absolutely flat relationship with respect to the leg of the caliper. In other words, the channel bar would have a tendency to tilt between the legs of the caliper and the exact degree of discrepancy between the legs of the channel bar would be very difficult to determine. It is a prime object of the present invention, therefore, to provide an improved gauging or measuring device for measuring channel bars, the device permitting the checker to quickly check the height of the legs of the bar in a manner wherein an accurate measurement is secured.

A still further object is to provide a gauging device having a pair of arms connected together intermediate their ends, one of said arms having a clamping member adapted to be inserted in the space formed by the parallel legs of a channel or U-shaped member, the clamping member being effective to maintain the flat or base wall of the channel bar in flat secure engagement with the other arm of the gauging device.

A still further object is to provide a scissors type gauging device having a pair of arms connected together, one of said arms including a pair of laterally spaced individual plungers which are adapted to engage the upper edges of the legs of a channel-shaped member to effectively measure and indicate any discrepancies between the lengths of said legs.

2

A still further object is to provide a gauging device for measuring the height of the legs of channel members, the gauging device including a clamping member for maintaining the channel bar in secure engagement with one of the legs of the gauging device, the other leg of the gauging device including a pair of laterally spaced sleeves in which plungers are resiliently positioned, the plungers being adapted to engage the upper edges of the legs, the plungers including graduations effective to indicate the relative length or height of the legs of the channel bar.

These and further objects will become more readily apparent from a reading of the specification when taken in connection with the accompanying sheet of drawing.

Figure 1:
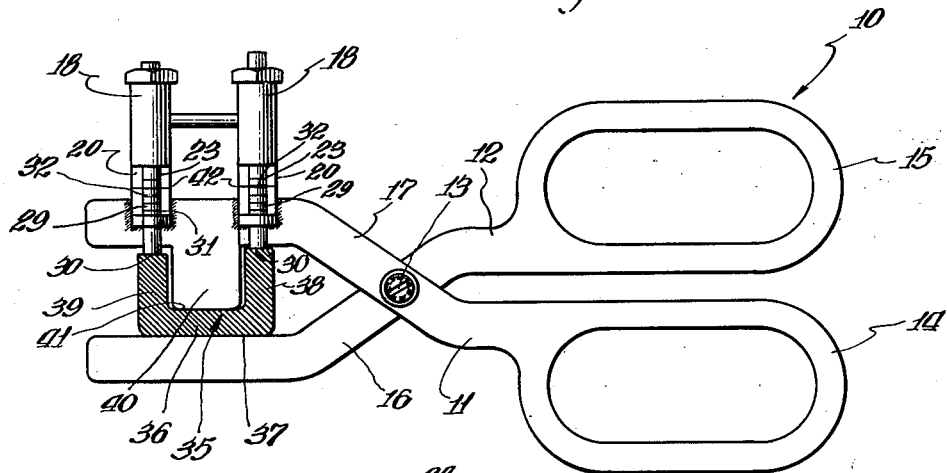
Fig. 1 is a side elevational view of a gauging device applied to a channel bar or a U-shaped member.

Referring now, particularly to Fig. 1, a gauging device is generally indicated by the reference character 10. The gauging device 10 includes a pair of scissor-like arms 11 and 12 which are connected intermediate their ends by a pivot member 13. The arms 11 and 12 are respectively provided with grasping grips 14 and 15. The arms 11 and 12 are provided at their other ends with gripping members or portions 16 and 17 which extend in a substantially parallel direction with respect to each other. A pair of laterally spaced gauging members 18 are supported on the arm 17. Each gauging member 18 comprises a sleeve 19 having a downwardly extending flat portion 20 which is rigidly secured to the arm 17 by welding or other fastening means. The downwardly extending portion 20 has a lip 21 which projects laterally outwardly from the downwardly extending portion 20. The lip 21 is provided with an opening 22.

Figure 2:
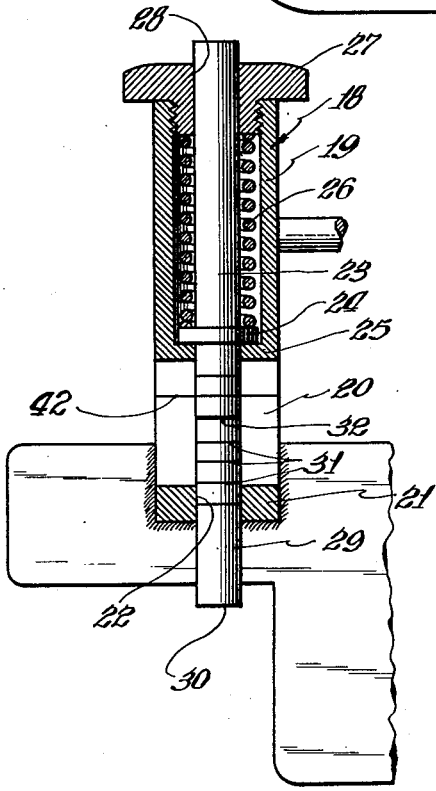
Fig. 2 is a cross-sectional view in elevation through a gauging element.

A plunger 23 is positioned within the sleeve 19 for relative reciprocation. The plunger 23 includes a shoulder 24 which, as indicated in Fig. 2, is positioned normally against a seat 25 provided in the lower end of the sleeve 19. A spring 26 encircles the plunger 23, the spring 26 having one end in engagement with a threaded cap 27 which is threaded into the sleeve 19. The spring 26 at its other end is in engagement with the shoulder 24 for normally urging the shoulder into engagement with the seat 25. The upper end of the plunger 23 is in relative sliding engagement with a bore 28 provided in the cap 27.

The plunger 23 is provided at its lower end with an integral extension 29. The extension 29 is in relative sliding engagement with the bore or opening 22 in the lip 21. The lower end of the extension 29 is provided with a contact point 30 the purpose of which will become presently apparent. A plurality of spaced indicating lines or graduations 31 are provided on the extension 29. These lines 31 may be formed on the extension 29 by painting, stenciling, etching or any other suitable method. One of the lines 32 is of larger cross-sectional thickness for the purpose of distinguishing it from the other lines 31 or it may distinguish from the other lines 31 by color.

In Fig. 1 the gauging device 10 is shown in position for measuring a channel 35. The channel 35 consists of a base wall 36 which has at its underneath side a flat surface 37. The channel 35 is provided with a pair of laterally extending legs 38 and 39 which extend in substantially parallel relation with respect to each other.

In measuring the legs 38 and 39 of the channel-shaped section 35 the measurement is naturally taken from the flat surface 37 of the base wall 36. In this manner the height or length of the legs 38 and 39 can be properly measured. With conventional types of calipers having parallel arms movable relative to each other it has been exceedingly difficult to place the flat surface 37 the channel 35 or base wall 36 in flatwise contact with the lower arm of the caliper. Where one of the legs of the channel member would be longer than the other leg, clamping of the channel bar between the arms of the conventional caliper would normally cause twisting of the channel member so that the base wall would not be in flatwise contact with the lower arm of the caliper. In the present invention, however, as best shown in Fig. 1, the channel 35 is firmly gripped against the arm 16 of the gauging device 10, by means of a clamping member 40 which may be integrally formed with the upper arm 17 and which extends in a direction toward the arm 16. The clamping member 40 extends into the space formed by the legs 38 and 39 of the channel member 35. The clamping member 40 firmly engages the inside surface 41 of the base wall 36 and thus holds the base wall 36 securely against the arm 16 in flatwise contact. Since the channel member 35 is thus rigidly held against the arm 16 proper measurement of the legs 38 and 39 is now possible. The pressure for holding the clamping member 40 in this position is, of course, afforded by the operator who has grasped the grasping grips 14 and 15.

As shown in Fig. 1 the leg 39 of the channel 35 is of lesser height than the leg 38. The contact points 30 of both plungers 23 are in engagement with the upper edges of the legs 38 and 39. In this position of the plungers 23 the shoulders 24 have been moved away from the seats 25 and the springs 26 resiliently urge the plungers 23 against the legs 38 and 39.

A distinctive indicating line or mark 42 is provided on the downwardly extending portion 20 of each gauging member 18. The marks 42 are adapted to laterally align with any one of the graduations 31 and 32 which are provided on the extensions 29. Supposing now, that the legs 38 and 39 of the channel bar 35 are both of substantially the same length, the indicating line 32 of both plungers 23 would be in lateral alignment with the indicating marks 42. By a quick glance, therefore, the checker could determine that the legs were both of the proper length and thus the channel bar would pass inspection. In Fig. 1 it can be seen that the graduation or indicating mark 32 of one of the gauging elements 18 is in alignment with the mark 42 and thus the checker can immediately determine that the length of the leg 38 is proper and within the tolerances required. However, with respect to the leg 39 of the channel bar 35, he can see that there is quite a discrepancy between it and the leg 38 since the graduation 32 is considerably below the mark 42 on the adjacent gauging member 18. The graduations 31 are so spaced apart and calibrated that the checker can immediately determine what the discrepancies are in the terms of inches or other linear measurement.

The gauging device 10 is particularly adaptable for production checking in that it can be quickly applied by the checker to the article. The clamping member 40 will, in each case, securely hold the channel member 35 in proper position so that an accurate measurement can be obtained. By the utilization of this gauging device it is self-evident that the flat edge 37 from which the height measurement is taken is always in flatwise contact with the arm 16 so that an accurate measurement can be obtained.

It can now be seen that the objects of the invention have been fully achieved and that an improved gauging device for measuring channel bars has been provided. It must be understood that changes and modifications may be made in this design without departing from the spirit of the invention as disclosed nor from the scope thereof as defined in the appended claims.

What is claimed is:

1. A measuring device for measuring a channel shaped section having a base wall and a pair of legs extending outwardly from the wall comprising; a pair of arms pivotally connected to each other intermediate their ends, a hand grasping portion at one end of each arm, first and second channel gripping portions respectively at the other ends of the arms, a generally rectangular clamping member projecting from the first gripping portion toward the second gripping portion, said clamping member being positionable between the legs of the channel section for engaging the base wall of the section and for clamping the same against the second gripping portion, a pair of laterally spaced sleeves connected to said first gripping portion, a plunger in each sleeve positioned for reciprocation, each plunger having a contact extension projecting outwardly of the sleeve for engaging ends of the legs of the channel shaped section held between the gripping portions, and visible graduations on each plunger for indicating the relative difference in length between the legs.

2. A measuring device for measuring a channel shaped section having a base wall and a pair of legs extending outwardly from the wall comprising; a pair of arms pivotally connected to each other intermediate their ends, a hand grasping portion at one end of each arm, first and second channel gripping portions respectively at the other ends of the arms, a clamping member projecting from the first gripping portion toward the second gripping portion, said clamping member being positionable between the legs of the channel section for engaging the base wall of the section and for clamping the same against the second gripping portion, a pair of laterally spaced sleeves connected to said first gripping portion, a plunger in each sleeve positioned for reciprocation, each plunger having a contact extension projecting outwardly of the sleeve for engaging ends of the legs of the channel shaped section held between the gripping portions, visible graduations on each plunger for indicating the relative difference in length between the legs, and resilient means connected to each plunger for yieldingly urging the plunger into engagement with the end of the leg.

3. A measuring device for measuring a section having a base wall and a pair of legs extending outwardly from the wall in channel shaped relation; comprising a pair of arms pivotally connected to each other intermediate their ends, a hand grasping portion at one end of each arm, first and second gripping portions respectively at the other ends of said arms, a clamping member on the first arm, said clamping member being engageable with the base wall for rigidly clamping the same against the second gripping member, a pair of gauge members connected to said first gripping member in transversely spaced relation with respect to each other, each gauge including a sleeve, a plunger movably mounted in each sleeve, each plunger including a contact extension projecting outwardly of the sleeve for engaging the ends of the legs, resilient means for urging each contact extension into contact with a leg, indicating means on each gauge, and visible graduations on each contact extension, said graduations being registerable with the indicating means for indicating the relative length of each leg.

4. A measuring device for measuring a section having a base wall and a pair of legs extending outwardly from the wall in channel shaped relation; comprising a pair of arms pivotally connected to each other intermediate their ends, a hand grasping portion at one end of each arm, first and second gripping portions respectively at the other ends of said arms, a clamping member on the first arm, said clamping member being engageable with the base wall for rigidly clamping the same against the second gripping member, a pair of gauge members connected to said first gripping member in transversely spaced relation with respect to each other, each gauge including a sleeve, a plunger movably mounted in each sleeve, each plunger including a contact extension projecting outwardly of the sleeve for engaging the ends of the legs, indicating means on each gauge, and visible graduations on each contact extension, said graduations being registerable with the indicating means for indicating the relative length of each leg.

5. A measuring device for measuring a section having a base wall and a pair of legs extending outwardly from the wall in generally U-shaped relation; comprising a pair of arms pivotally connected intermediate their ends, each arm having a gripping portion at one end thereof, means connected to one of said gripping portions adapted to engage the base wall along a surface thereof disposed between the legs for urging the same into flatwise contact with the other gripping portion thereby securely clamping the section between said arms, and gauge means on one of said gripping members, said gauge means including a pair of laterally spaced plungers, means reciprocally positioning said plungers on said last mentioned gripping members, biasing means connected to each plunger for urging said plungers into engagement with said legs, and indicating means associated with the plungers for indicating the length of one leg with respect to the other.

6. A measuring device for measuring a section having a base wall and a pair of legs extending outwardly from the wall in generally U-shaped relation; comprising a pair of arms pivotally connected intermediate their ends, each arm having a gripping portion at one end thereof, means connected to one of said gripping portions adapted to engage the base wall along a surface thereof disposed between the legs for urging the same into flatwise contact with the other gripping portion thereby securely clamping the section between said arms, gauge means on one of said gripping members, said gauge means including a pair of spaced plungers connected to one of said gripping members for relative sliding movement toward and away from the second gripping member, resilient means connected to said plungers for urging the same into contact with the legs of the section, stationary indicating means on said first gripping member, and graduations on said plungers, said indicating means and said graduation being arranged to indicate the relative length of said legs.

7. A measuring device for measuring a section having a base wall and a pair of legs extending outwardly from the wall in generally U-shaped relation; comprising a pair of arms connected to each other, said arms being movable in a direction toward each other, a clamping member on one of said arms, said clamping member projecting in a direction toward said other arm, said clamping member being substantially of the same width as the distance between the legs of the section and being engageable with the base wall along a surface theerof disposed between the legs to clamp the wall in flatwise contact with the other arm, a pair of gauge members connected to one of said arms, said gauge members each including a plunger movable into engagement with a leg of the section, and graduations on said plungers for indicating the relative difference in length between said legs.

8. A measuring device in accordance with claim 7 including a resilient member connected to each plunger for normally urging the plungers in a direction toward said other arm.

LESLIE M. STRAND.

References Cited in the file of this patent
UNITED STATES PATENTS

| Number | Name | Date |
|---|---|---|
| 2,302,451 | Markey | Nov. 17, 1942 |